J. G. HOLDERMAN.
MILLSTONE-DRESSER.
No. 195,818. Patented Oct. 2, 1877.
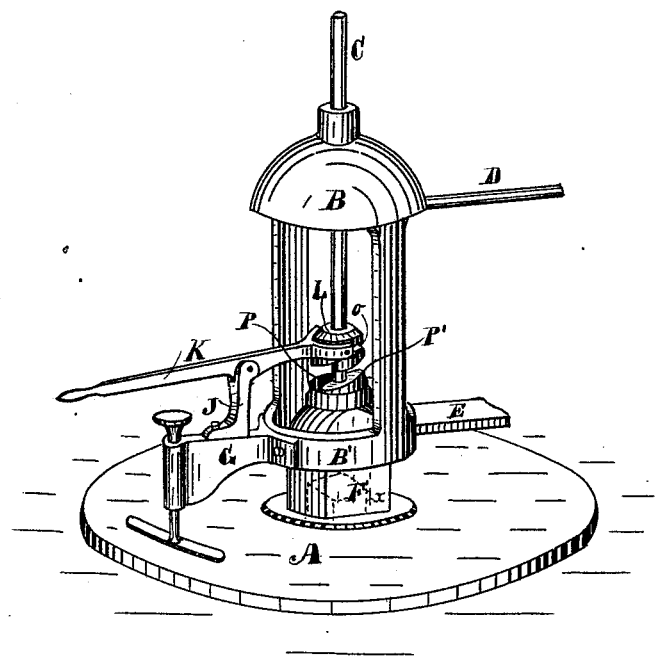

UNITED STATES PATENT OFFICE.

JACOB G. HOLDERMAN, OF INDIANAPOLIS, INDIANA.

IMPROVEMENT IN MILLSTONE-DRESSERS.

Specification forming part of Letters Patent No. 195,818, dated October 2, 1877; application filed February 19, 1877.

*To all whom it may concern:*

Be it known that I, JACOB G. HOLDERMAN, of Indianapolis, county of Marion, State of Indiana, have invented a new and useful Attachment for Emery-Wheel Millstone-Dressers, of which the following is a description, reference being had to the accompanying drawings.

My invention relates to that class of millstone-dressers in which a frame supports a vertical shaft driven from the spindle of the stone to be dressed, and imparting motion to the emery-wheel; and the object of my improvement is to provide emery-wheel millstone-dressers with a clutch-coupling, so as to allow power to be applied to, or removed from, the emery-wheel mechanism without the necessity of stopping the millstone-spindle, which has heretofore been required, in order to remove the dresser or to adjust it on the stone. In large mills it is very annoying to have to stop several sets of burrs in order to adjust an emery-wheel millstone-dresser on one of them; and, besides, there is great loss of time, all of which is obviated in my improvement.

My invention consists of attaching to the stationary adjustable head of an emery-wheel millstone-dresser a clutch-coupling, to be operated by a lever, and to engage with a clutch formed on the upper side of the carrier, which is attached to the millstone-spindle in such a manner as to allow the carrier to be placed on the said spindle while it is in motion, and to allow the emery-wheel mechanism to be adjusted while the spindle is in motion also, and to allow power to be applied to or removed from the emery-wheel by a movement of the lever, which throws the upper clutch-coupling, attached to the lever, either into or out of gear with the clutch formed on the upper side of the carrier, and thus save time and the trouble of stopping the mill.

In the drawings I have represented my improvement by a perspective drawing without the emery-wheel millstone-dresser attached.

A represents the stone to be dressed. On the head of the millstone-spindle, in the center, is placed the carrier F, having beveled clutches P P' above, the carrier having a recessed lower end to receive the end of the spindle, as shown at $x$. The shaft C is secured loosely to the carrier, so as to allow the spindle below and carrier F to revolve, and shaft C remain still until the upper coupling L is brought in gear with the carrier-clutches P P', when the shaft, which is secured to coupling L by a feather, is revolved, and communicates power to the emery-wheel by means of the shaft D, geared in any suitable manner with the shaft C. On the lower part B' of the head an arm, G, is attached, and to this arm an upright standard, J, is secured. This standard J is provided with a fork above to receive the lever K, which is pivoted thereto, as shown in the drawings. The end of the lever that connects with the clutch L is provided with a fork and pins to engage with the clutch, the pins or rollers operating in the groove $o$ of clutch L, in the usual manner.

When the clutch L is disconnected from the carrier the emery-wheel stops, although the millstone-spindle and carrier revolve. When the clutch L is brought in gear with the carrier, then the emery-wheel revolves.

To the emery-wheel millstone-dresser or head B B', arm G, shafts C and D, I make no claim, as they are shown in the patents before referred to; and to a clutch-coupling I make no broad claim, as it is old.

What I claim as new, and wish to secure by Letters Patent, is—

1. The combination of the carrier F, the vertical shaft C, and devices, substantially as described, for connecting and disconnecting the same, when said carrier is adapted to the millstone-spindle, as specified.

2. The carrier F, with bevel-clutches, combined with the shaft C, lever K, clutch L, and frame, constructed to be applied to a millstone and to be connected to the dresser, as set forth.

In testimony whereof I have signed my name to this specification in the presence of two subscribing witnesses.

JACOB G. HOLDERMAN.

Witnesses:
E. O. FRINK,
GEORGE HAY.